United States Patent Office 3,405,196
Patented Oct. 8, 1968

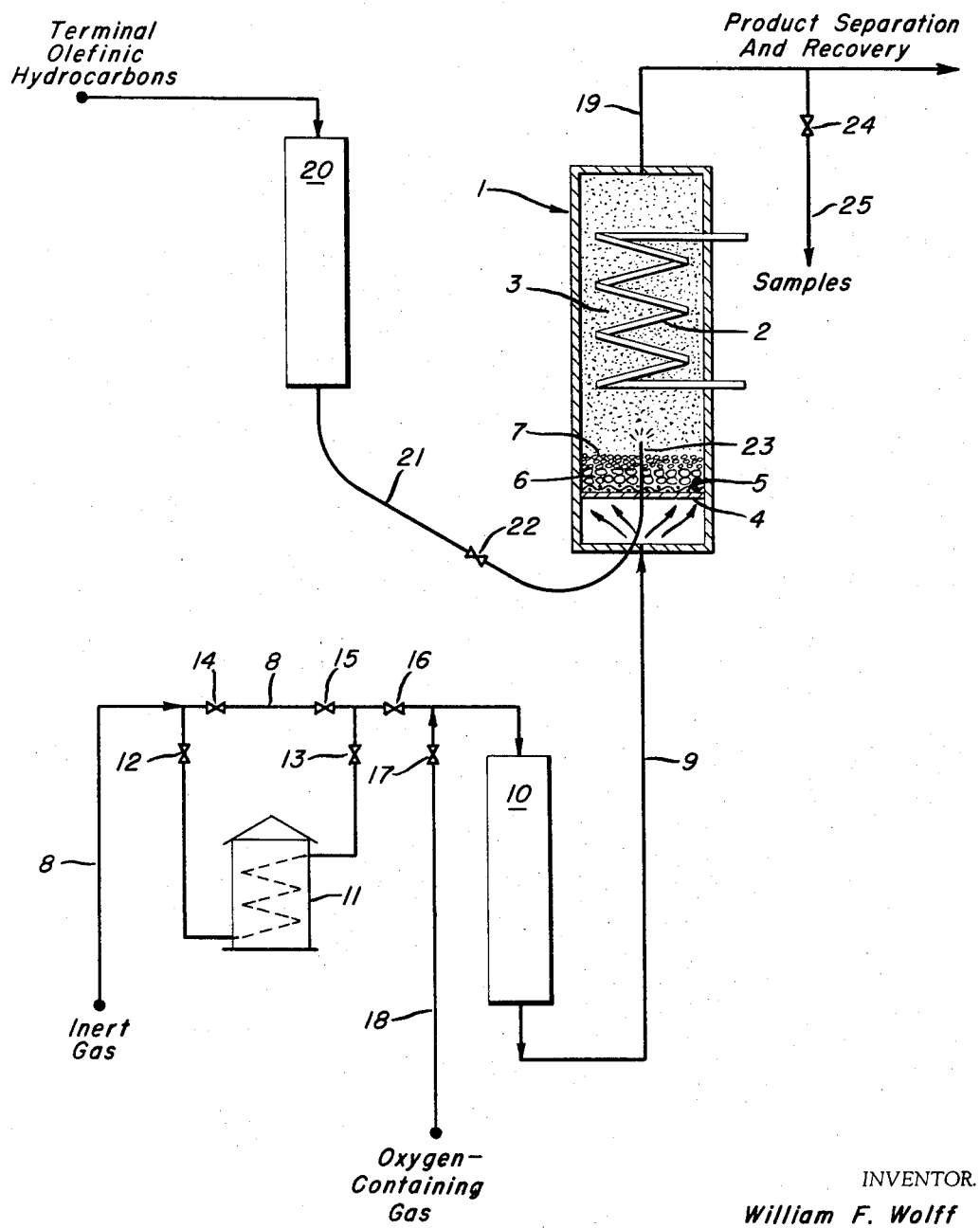

3,405,196
ISOMERIZATION OF TERMINAL OLEFINS
William F. Wolff, Park Forest, Ill., assignor to Standard Oil Company, Chicago, Ill., a corporation of Indiana
Continuation-in-part of application Ser. No. 354,417, Mar. 24, 1964. This application Apr. 10, 1967, Ser. No. 629,617
10 Claims. (Cl. 260—683.2)

ABSTRACT OF THE DISCLOSURE

Catalyst-preparation method wherein a catalyst comprising an alkali metal dispersed upon a high-surface, substantially inert, solid support is contacted with an activating gas at a temperature between about 5° C. and about 50° C. in sufficient quantity to provide an oxygen-to-alkali metal ratio between about 0.01 and 2.0 atoms of oxygen per atom of alkali metal. The activating gas is selected from a molecular-oxygen-containing gas, nitrous oxide, mixtures thereof, and mixtures thereof with inert gases.

*Cross-references to related applications*

This is a continuation-in-part application of application Ser. No. 354,417, filed Mar. 24, 1964 and now abandoned.

*Background of the invention*

This invention pertains to a process for the conversion of hydrocarbons, which process is directed to the molecular rearrangement of olefin hydrocarbons. The process employs a catalyst which is a composition containing significant amounts of an alkali metal or a compound thereof.

*Summary of the invention*

This invention relates to a process for the conversion o fa terminal olefin to an internal olefin. More particularly, it relates to an improved process for the isomerization of a terminal olefinic hydrocarbon in which the double bond is shifted from the terminal position to a more-centrally-located position. Still more particularly, it relates to the conversion of pentene-1 to pentene-2 and butene-1 to butene-2.

The development and production of automobile engines which have high compression ratios have resulted in the necessity of hydrocarbons which have antiknock characteristics. One of the many petroleum refining processes which produce high antiknock hydrocarbons is the catalytic alkylation of isoparaffin hydrocarbons with olefins. Olefins which have their double bonds more centrally located in the molecule produce higher-octane alkylate. Hence, this type of olefin is desirable. My process will efficiently produce those olefins which are desirable for alkylation feed.

My process comprises an improved process for the production of internal olefins from terminal olefins in which an improved catalyst is employed. It is known in the art that terminal olefinic hydrocarbons can have their double bonds shifted to a more-centrally-located position in the presence of a supported alkali-metal catalyst. This has been disclosed in U.S. Patent 2,965,689 and U.S. Patent 2,952,719. My improved catalyst is a supported alkali-metal catalyst which has seen a specific pretreatment and which can be used for the conversion of terminal olefins to internal olefins, for the preparation of alkylation feed and for the production of chemical intermediates. Much improved yields of the internal olefinic hydrocarbons result when my process is used rather than the presently available processes.

My improved process comprises shifting the double bond in a terminal olefinic hydrocarbon to a more-centrally-located position in the presence of a supported alkali-metal catalyst that has been pretreated in an activating atmosphere. The improvement of this process comprises the pretreating of the catalyst with an activating gas prior to the use of the catalyst in the conversion process.

One embodiment of my invention is a process in which the double bond in a terminal olefinic hydrocarbon is shifted to a more-centrally-located position in the molecule in the presence of a supported alkali-metal catalyst that has been pretreated with a gas that contains molecular oxygen.

Another embodiment is a process in which a terminal olefin is converted to an internal olefin in the presence of a supported alkali-metal catalyst that has been pretreated with a gas that contains nitrous oxide.

The catalyst used in my process contains an alkali metal dispersed on a high-surface, substantially inert support. The alkali metal may be selected from a group comprising sodium, potassium, rubidium and cesium. Sodium is particularly desirable. The supporting material should possess a high surface area, large pores, and be only slightly acidic. The supporting material should be calcined to drive out the water. This calcination may be carried out at temperatures of from 150° to 650° C., 450° to 600° C. being particularly desirable, and a pressure of from 0.1 mm. of mercury to 1.0 atmosphere for 0.1 to 50 hours. The supporting material is desirable in a granular or powdered form. Activated alumina is a particularly desirable supporting material.

This alumina generally has a surface area ranging from about 50 to 1,000 square meters per gram. The alumina used in the preparation of the catalyst employed in the tests mentioned below has a surface area of 200–210 square meters per gram, a packed bulk density of 68 pounds per cubic feet and a particle size of 80–200 mesh. This granular alumina has an ignition loss of 6.8% at 1100° F. and is composed of 92.0% $Al_2O_3$, 0.8% $Na_2O$, approximately 0.1% $SiO_2$ and approximately 0.1% $Fe_2O_3$.

The supported alkali metal catalyst is prepared by contacting the high surface area supporting material with the alkali metal while the latter is in the molten state. This contacting is done in the presence of agitation under an inert atmosphere, such as argon, nitrogen or helium. This so-called inert atmosphere must be such that it will not react with the alkali metal to transform the alkali metal into a derivative that will not catalyze isomerization. The alkali metal may be added to the calcined support at a temperature of from 10° to 35° C. under an inert atmosphere. The resulting mixture is then heated to a temperature of from 150° to 500° C., 300 to 400° C. being particularly desirable. The mixture is continuously agitated at the elevated temperature until the alkali metal appears to be evenly distributed upon the surface of the supporting material. Even distribution usually will be attained within a period of from approximately 10 minutes to approximately 2 hours. If sodium is being distributed on activated alumina, a uniform layer of sodium is indicated by a blue-black color which occurs over the entire surface of the alumina. The catalyst may contain between about 1 and 40% by weight of the alkali metal, depending upon the particular alkali metal and the particular supporting material employed. Generally, that amount of alkali metal which is sufficient to form a mono-molecular layer on the support is desired. When sodium is to be on activated alumina, the resulting catalyst will usually contain from 2 to 15% by weight of sodium.

The improvement of my process comprises the pretreating of the supported alkali-metal catalyst with an activating gas at a temperature within the range of from 5° to 50° C., 20° to 35° C. being particularly desirable. Preferably a positive flow of the activating gas through the catalyst bed is maintained. Care should be taken during the pretreatment to avoid general or localized overheating of the catalyst. The activating gas is selected from the group consisting essentially of a molecular-oxygen-containing gas, nitrous oxide (N₂O), mixtures thereof and mixtures thereof with inert gases. These inert gases are gases which will not chemically react with the sodium, e.g., nitrogen, argon, neon and helium. It is desirable that the activating gas be used in an amount which is sufficient to provide a quantity of oxygen which will furnish an oxygen-to-alkali-metal ratio within the range between about 0.01 and 2.0 atoms of oxygen per atom of alkali metal. Of course, the atoms of oxygen would be the atoms of oxygen in the activating gas and the atoms of sodium are the atoms of sodium present in the catalyst that is being used to isomerize the terminal olefins. Preferably, the quantity of activating gas should be maintained at a level which will provide an oxygen-to-alkali-metal ratio within the range between 0.1 and 0.4 atom of oxygen per atom of alkali metal. The rate of flow of the activating gas should be maintained at a level which will not result in the creation of excessive temperatures.

*Brief description of the drawing*

My process will be more fully understood with reference to the examples and the drawing which follow. The drawing exemplifies a specific embodiment of a proposed installation of my process and is a simplified diagrammatic representation of this embodiment.

*Description of the preferred embodiments*

Various hydrocarbon feed stocks may be used in my process. These comprise the alpha-olefins such as butene-1, pentene-1, hexene-1 and similar olefins. In addition, a liquified mixture of butanes and butenes which are recovered from the products of catalytic cracking and/or thermal cracking of gas oils, or from the products of other refinery operations, may be used. The composition of such a refinery stream may be widely variable, the producing sources dictating such composition. This mixture is commonly referred to as a refinery B—B stream. Furthermore, organic compounds such as 1-phenyl - butene - 1, 2 - phenyl - butene - 1, 1 - phenyl-pentene - 1 and 4 - tolyl - pentene - 1 may also be used as feed stocks in my process. Since water has a deleterious effect upon the alkali-metal catalyst, drying of the feed stock is particularly desirable before the feed stock is contacted with the catalyst.

The isomerization of the terminal olefin, or mixture of olefins, can be performed as either a batch, continuous or semi-continuous process. A fixed, moving or fluidized catalyst bed may be employed; and the contacting of the catalyst with the hydrocarbons may be performed either in the presence of or the absence from a diluent that is substantially inert with respect to the catalyst under the conditions employed. The isomerization of the alpha-olefins may be carried out at relatively low pressures, but pressures up to approximately 100 to 350 p.s.i.g. may be used to keep the lower boiling olefins in the liquid state. It is particularly desirable that the hydrocarbon feed be kept in the liquid state. Temperatures ranging from −80° C. to 100° C. are usually employed. The temperature at which the isomerization is to be conducted will be dictated by the equilibrium between the olefin charge and the desired olefin isomer or isomers. For example, when butene-1 is being converted to butene-2, a temperature that does not exceed 30° C. is preferred. The relatively high activity of this type of catalyst permits the use of temperatures well below room temperature while satisfactory reaction rates are being maintained.

The following examples are presented to illustrate specific embodiments of my process, but it is not intended that these examples unduly limit the scope of my invention.

EXAMPLE I

This example illustrates the use of air as the activating gas. A 3-necked, 200-milliliter flask was fitted with a stainless steel stirrer and a gas-inlet valve. Into it were charged 30.0 grams of the 80–200 mesh activated alumina which has been described above. The alumina was heated with stirring under a stream of argon until the skin temperature of the flask reached 710° C. The source of heat was removed and the dry alumina was cooled to a temperature of approximately 24° C. Under argon, 4.1 grams of sodium metal were added. The sodium was cut and weighed while in a paraffinic oil. The mixture was then heated with stirring under a static argon blanket until the skin temperature of the flask reached 410° C. This latter temperature was maintained for 40 minutes. The product, a dark blue solid, was then cooled to a temperature of approximately 24° C. A 3.2-gram portion of this sodium-on-alumina preparation was taken from the flask and was placed in an "Emulsion Tube." It was then exposed to air until a definite temperature rise, as determined by touch, was obtained. The catalyst sample was purged with nitrogen and then added to 100 cc. of pentene-1 that had been dried previously by stirring with sodium-mercury amalgam. The amalgam was not subsequently removed from the olefin. Stirring was continued after the catalyst addition and a blanket of nitrogen was maintained over the reaction mixture. With the mixture being held at a temperature of approximately 24° C., samples of the liquid, approximating one-half cc. each, were withdrawn periodically. Immediately upon withdrawal, each liquid sample was completely distilled from the sample vial to a clean vial to permit removal of catalyst traces. This distillation was accomplished by connecting the sample vial to the clean vial by means of an extended piece of polyethylene tubing. The clean vial was cooled in liquid nitrogen while the sample vial was warmed by the heat from the experimenter's hand. Such distillations required approximately 4 minutes apiece. The samples were then analyzed by gas chromatography. The results obtained from these analyses are presented in Table I.

TABLE I

| Time from catalyst addition, minutes | Percent pentene-1 | Percent pentene-2 |
|---|---|---|
| 0 | 97.90 | 0.0 |
| 15 | 5.13 | 92.95 |
| 48 | 2.89 | 95.19 |
| 105 | 2.04 | 95.07 |
| 165 | 1.87 | 96.07 |
| 225 | 1.90 | 96.05 |

A 3.1-gram portion of the sodium-on-alumina catalyst was removed from the preparation flask and was maintained under an inert atmosphere. This sample was not exposed to air and was added to 100 cc. of pentene-1 as above. The results obtained ase presented in Table II.

TABLE II

| Time from catalyst addition, minutes | Percent pentene-1 | Percent pentene-2 |
|---|---|---|
| 0 | 97.90 | 0.0 |
| 15 | 88.39 | 9.84 |
| 45 | 65.77 | 32.33 |
| 105 | 37.35 | 61.02 |
| 195 | 22.03 | 76.14 |

These results show that sodium deposited on alumina is a good catalyst for the isomerization of a terminal olefin but that a catalyst prepared and used according to my process is much more active. The results indicate that after 15 minutes, the conversion with the air-treated sodium-on-alumina catalyst is at least 9 times as great as that obtained with the untreated sodium-on-alumina catalyst.

EXAMPLE II

This example illustrates that at specific pretreatments of the catalyst with the activating gas, optimum results can be obtained. It further illustrates that treatment with too much activating gas, as well as too little activating gas, does not provide the best activity of the catalyst for converting terminal olefins to internal olefins. In this example, isomerization runs were carried out with catalyst treated with measured amounts of dry air. Runs were carried out at 25° C., 0° C. and —78° C., and with olefin charges of different purity. Except as otherwise noted, the experimental procedures described in Example I were used. The catalyst was either sodium-on-alumina or sodium-on-charcoal. The catalyst to be added to the olefin was treated with air in the sample tube by pumping a measured amount of dry air into the tube against a slight nitrogen pressure. The air was introduced, with continual shaking of the tube, at such a rate that the catalyst became warm, but not hot, to the touch. The small amounts of air were dried with indicating "Drierite" while the large amounts of air were dried by passage through two "Drierite" columns, one of which was kept at —78° C. The olefin used in this series of tests was again pentene-1, and the results of this series are given in the following table:

TABLE III

| Catalyst | Vol. of air used in cat. treatment, cc./g. cat. | Oxygen-to-sodium ratio, atoms oxygen per atom sodium | Olefin purity, percent pentene-1 | Temperature, ° C. | Maximum relative reaction rate |
|---|---|---|---|---|---|
| 10.7% Na on alumina | 0 | 0.00 | 97.9 | 25 | 12 |
| Do | 4 | 0.015 | 97.9 | 25 | 27 |
| Do | 30 | 0.11 | 97.9 | 25 | 196 |
| Do | 100 | 0.37 | 97.9 | 25 | 177 |
| Do | 560 | 2.07 | 97.9 | 25 | 16 |
| Do | 35 | 0.13 | 97.9 | 0 | 123 |
| Do | 35 | 0.13 | 97.9 | —78 | 0.0 |
| Do [1] | 45 | 0.17 | 100.0 | —78 | 105 |
| 12.6% Na on alumina | 0 | 0.00 | 100.0 | —78 | 0.7 |
| Do | 45 | 0.14 | 100.0 | —78 | 270 |
| Do | 310 | 0.97 | 100.0 | —78 | 32 |
| 12.4% Na on charcoal | 0 | 0.00 | 99.8 | 25 | 15 |
| Do | 5 | 0.016 | 99.8 | 25 | 8 |
| Do | 10 | 0.032 | 99.8 | 25 | 6 |
| Do | 60 | 0.19 | 99.8 | 25 | 2 |

[1] No sodium-mercury amalgam was used in this run. Pentene-1 was dried over sodium wire; reaction flask was dried by heating prior to the run.

The volumes of air were measured at 24° C. and approximately 1 atmosphere pressure. The activities of the various catalysts are compared in terms of the maximum rate at which they converted the pentene-1 into pentene-2, as measured over a period of at least 5 minutes. The reaction rates were expressed in terms of the pentene-1 consumed per gram of catalyst per minute. In the low-temperature runs, sodium-mercury amalgam was stirred with the pentene-1 at room temperature for at least ½ hour before cooling the olefin to reaction temperature. The amalgam was left in the mixture. The catalyst was also cooled to the reaction temperature before it was added to the olefin. Samples that were withdrawn for analysis were introduced into vials containing distilled water so that no additional isomerization of the samples would occur after withdrawal from the reaction mixture.

The calculated ratio of atoms of oxygen to atoms of sodium is presented in column 3 of the Table III for each datum point. The atoms of sodium used in the calculations of these values represent the actual amount of sodium introduced onto the support and not the amount present after the impurities in the support have reacted with the sodium.

The results of this example show that optimum results may be obtained if the sodium-on-alumina catalyst is treated with limited, but substantial, amounts of air. Treatment of the catalysts with excess air produced catalysts which were superior to the original sodium-on-alumina catalyst but which were inferior to the catalysts treated with the optimum amounts of air. In all cases, the air-treated catalysts were shown to be superior to the untreated sodium-on-alumina. However, attempts to improve the activity of sodium-on-charcoal by air treatment were unsuccessful, such treatment resulting in a decrease in activity.

Optimum improvement of the relative reaction rate occurred when the oxygen-to-sodium ratio was maintained between 0.1 and 0.4. Some improvement occurred when the oxygen-to-sodium ratio was as low as 0.015 and as high as 2.0. Therefore, the treatment of the catalyst with the activating gas must be sufficient to provide an oxygen-to-sodium ratio within the range between about 0.01 and 2.0 atoms of oxygen per atom of sodium. Preferably the amount of activating gas to be used should be sufficient to provide an oxygen-to-sodium ratio within the range between 0.1 and 0.4 atoms of oxygen per atom of sodium.

EXAMPLE III

This example illustrates the treatment of the catalyst with air after isomerization has been initiated. A run was carried out at 25° C. in which an untreated sodium-on-alumina catalyst, prepared as above, was used and air was slowly introduced into the reaction flask after isomerization had begun. No increase in isomerization rate was obtained; rather the rate decreased considerably more rapidly than in the case of runs carried out under an inert atmosphere. Furthermore, after a short time, the isomerization stopped completely.

EXAMPLE IV

This example illustrates the treatment of the catalyst with di-butyl peroxide after isomerization has been initiated. Even though only 0.5 cc. of di-t-butyl peroxide was added to the pentene-1 after isomerization had begun over an untreated sodium-on-alumina catalyst, an almost immediate deactivation of the catalyst was obtained. The untreated catalyst had been prepared as described above.

EXAMPLE V

This example illustrates the isomerization of butenes with an air-treated catalyst. A 0.58-gram portion of sodium-on-alumina catalyst was shaken with 20 cc. of dry air which were added in 2-cc. increments. The addition of the air was brought about by the removal of the gas from a burette by mercury displacement. The calculated oxygen-to-sodium ratio for this treatment was 0.21 atom of oxygen per atom of sodium. The sodium-on-alumina catalyst had been prepared as described above by depositing 2.1 grams of sodium metal on 30 grams of alumina. This air-treated sodium-on-alumina catalyst was then added to 100 milliliters of liquid butene-1. This mixture was refluxed at atmospheric pressure and stirred with a magnetic stirrer. A sample of the hydrocarbon was withdrawn after 5 minutes and was analyzed by gas chromatography. The analysis showed a 27.3% conversion of butene-1 to butene-2.

A 0.59-gram portion of the sodium-on-alumina catalyst prepared for this example was added to another 100 milliliter portion of liquid butene-1 with similar refluxing and stirring. In this case, the sodium-on-alumina catalyst had seen no prior air treatment. Analysis showed only a 1.9% conversion of butene-1 to butene-2. The results of this example show, as those in the examples above, that the air treatment substantially increases the isomerization rate.

EXAMPLE VI

This example illustrates the pretreating of a sodium-on-alumina catalyst with nitrous oxide. The alkali-metal-containing catalyst received a treatment in nitrous oxide. Alumina, having the properties specified above, was heated to about 700° C. (skin temperature of container) under a stream of argon and was then cooled. After cooling, 7.0 grams of sodium metal were deposited on 60 grams of this 80–200-mesh alumina. The sodium and the alumina were stirred together at skin temperatures not exceeding 400° C. until a uniform blue-black product was obtained. About 3.2 cc. (2.9 grams) of this product were charged to an "Emulsion Tube" which had been fitted with a gas inlet tube and which had been dried previously by heating. This charging was carried out under a nitrogen atmosphere. After charging, 20 cc. of nitrous oxide were pumped into the tube with shaking in 2-cc. increments. The calculated oxygen-to-sodium ratio for this treatment was 0.062 atom of oxygen per atom of sodium. This value falls within the range established in Example II, which range is between 0.01 and 2.0 atoms of oxygen per atom of sodium. In other words, the oxygen atoms in the nitrous oxide molecules were sufficient to provide the above calculated oxygen-to-sodium ratio. Mercury displacement was again used to force the gas into the tube. Some heat evolution and whitening of the catalyst were observed. The catalyst was then added to 100 milliliters of pentene-1 in an ice bath. The pentene-1 was stirred with a magnetic stirrer under a nitrogen atmosphere. Small portions of the pentene were removed periodically, added immediately to water and measured for their respective refractive indices. The following results were obtained.

| Time (minutes): | Refractive index |
|---|---|
| 0 | $N_D^{20.50}$: 1.3714 |
| 5 | $N_D^{20.33}$: 1.3761 |
| 10 | $N_D^{20.35}$: 1.3791 |
| 20 | $N_D^{20.35}$: 1.3811 |
| 30 | $N_D^{20.35}$: 1.3813 |
| 50 | $N_D^{20.32}$: 1.3812 |
| 80 | $N_D^{20.35}$: 1.3810 |

The initial rate of isomerization, as measured by the increase in refractive index per gram of catalyst per minute, was $3.22 \times 10^{-4}$. When the same catalyst, but untreated with nitrous oxide, was used, the increase in the initial rate of isomerization was $0.60 \times 10^{-4}$ and $$0.83 \times 10^{-4}$$

in duplicate runs. This example demonstrates that a sodium-on-alumina catalyst pretreated with nitrous oxide is superior to an untreated catalyst for olefin isomerization.

A further understanding of my process may be gained from the specific embodiment exemplified by the following proposed installation, which is diagrammed in the attached figure. The desired supported alkali-metal catalyst, a sodium-on-alumina catalyst, is charged under an inert atmosphere to cylindrical vessel 1. Vessel 1 is insulated and contains coil 2 through which steam or a standard coolant can be circulated, depending upon whether heating or cooling of the contents of vessel 1 is desired. The inert atmosphere may be nitrogen. The catalyst exists in vessel 1 as a fluid bed 3. The particle size distribution of the catalyst is such that it will permit adequate fluidization so that efficient and uniform contacting of the catalyst particles with either a pretreating gas or the hydrocarbon being converted can be maintained. At the lower end of vessel 1 is a support for the catalyst bed. This support is made up of a grid 4, a fine screen 5 and several layers 6 and 7 of different-sized Alundum beads. The catalyst must be maintained under an inert atmosphere, which can be nitrogen. The inert gas is introduced into vessel 1 through lines 8 and 9 and drier 10. Such gas not only acts as an inert atmosphere, but also operates to keep the catalyst bed 3 fluidized. As the inert gas need not be at an elevated temperature at this time, heater 11 is not needed. Therefore, valves 12 and 13 remain closed while valves 14, 15 and 16 remain open. Drier 10 contains molecular sieves, or some other suitable desiccant, and is used to remove moisture from the various gases which pass through it prior to their introduction into vessel 1.

Before the catalyst is used to convert hydrocarbons, it receives a pretreatment with an activating atmosphere. In this embodiment of my process, the activating atmosphere comprises an oxygen-containing gas. The flow of inert gas to vessel 1 is stopped by closing valve 16. Valve 17 is opened and the oxygen-containing gas is passed through lines 18 and 9 and drier 10 into vessel 1. The design of the vessel and the selection of the flow rate of gas should be such as to maintain a suitable fluidized catalyst bed. The fluidized bed will permit the most efficient and uniform treatment of the catalyst.

The oxygen that is passed through the bed 3 should be held to an amount that is slightly less than that which is required to convert half of the available alkali metal to its oxide. Tests have indicated that excessive treatments in oxygen will not produce optimum catalyst activity, but it should be noted that even the excessive oxygen treatments do result in activity improvement. The exhaust gas will exit from vessel 1 through line 19. When the pretreatment has been completed, valve 17 is closed. This prevents the introduction of additional oxygen-containing gas into vessel 1. Valves 14, 15, and 16 are open while valves 12 and 13 remain closed. This permits inert gas to flow through lines 8 and 9 and drier 10 into vessel 1.

Since in this specific embodiment the hydrocarbon feed will be such that an elevated temperature of the catalyst bed 3 is not desired, heater 11 will not be used. The hydrocarbon feed will be a refinery B—B stream. If heavier hydrocarbons were used, the heater 11 would be needed. The catalyst bed should be cooled to a temperature of approximately 20°–25° F. When the catalyst bed is at the desired temperature, the hydrocarbon feed stock is introduced into vessel 1 through drier 20, line 21, valve 22 and inlet 23. The inlet 23 is so designed as to introduce the hydrocarbon without impinging it upon the sides of vessel 1. In this embodiment, a B—B stream is used as a hydrocarbon feed. The products from the reaction are withdrawn from vessel 1 through line 19 into a separation zone and appropriate recovery equipment. Samples of product are removed periodically from line 19 through valve 24 and outlet 25 so that the conversion can be monitored. When the results of appropriate tests performed on these samples indicate that the conversion has been reduced as a result of catalyst deactivation, the run may be halted, vessel 1 opened, used catalyst withdrawn and new catalyst installed. On the other hand, if a second vessel is present in the installation and is hooked in parallel with vessel 1, and if this second vessel contains pretreated catalyst, the hydrocarbon conversion can be switched to this second vessel while the catalyst in vessel 1 is changed. The parallel vessels may be operated alternately to furnish continuous operation.

What I claim is:

1. In a method for the preparation of an activated catalyst which is suitable for the isomerization of terminal olefins, which catalyst comprises an alkali metal dispersed upon an alumina support, the improvement which comprises pretreating said catalyst by contacting it with an activating gas selected from the group consisting of a molecular-oxygen-containing gas, nitrous oxide, mixtures thereof, and mixtures thereof with inert gases, said contacting being done at a temperature within the range between about 5° C. and about 50° C., the amount of said activating gas being sufficient to provide at least a positive flow of said gas through said catalyst without creating excessive temperatures and being sufficient to provide between 0.01 and 0.4 atom of oxygen per atom of alkali metal on the catalyst.

2. The method in accordance with claim 1 in which the alkali metal is selected from the group consisting of sodium, potassium, rubidium and cesium.

3. The method in accordance with claim 1 wherein said support is calcined activated alumina.

4. The method in accordance with claim 1 wherein the amount of said activating gas is sufficient to provide between 0.1 and 0.4 atom of oxygen per atom of alkali metal.

5. The process for the shifting of the double bond in a terminal olefinic hydrocarbon to a more-centrally-located position, which process comprises contacting an olefinic hydrocarbon containing at least 4 carbon atoms with a supported alkali-metal catalyst at a temperature between about −80° C. and about 100° C. and at a pressure which is less than about 350 p.s.i.g., said catalyst being prepared by dispersing a molten alkali metal upon an alumina support and contacting the resultant catalyst with an activating gas which is selected from the group consisting of a molecular oxygen-containing gas, nitrous oxide, mixtures thereof, and mixtures thereof with inert gases, said contacting being done at a temperature within the range between about 5° C. and about 50° C., the amount of said activating gas being sufficient to provide at least a positive flow of said gas through said catalyst without creating excessive temperatures and being sufficient to provide between 0.01 and 0.4 atom of oxygen per atom of alkali metal on the catalyst.

6. The process in accordance with claim 5 in which the alkali metal is selected from the group consisting of sodium, potassium, rubidium, and cesium.

7. The process in accordance with claim 5 in which the support of said catalyst is calcined activated alumina.

8. The process in accordance with claim 5 wherein the amount of said activating gas is sufficient to provide between 0.1 and 0.4 atom of oxygen per atom of alkali metal on the catalyst.

9. A process for the shifting of the double bond in a five-carbon-atom terminal olefinic hydrocarbon to a more-centrally-located position, which process comprises contacting said olefinic hydrocarbon with a supported alkali-metal catalyst at a temperature between about −80° C. and about 100° C. and at a pressure which is less than about 350 p.s.i.g., said catalyst being prepared by dispersing molten sodium metal upon a calcined activated alumina and contacting the resultant material with an activating gas which is selected from the group consisting of a molecular-oxygen-containing gas, nitrous oxide, mixtures thereof, and mixtures thereof with inert gases, said contacting the resultant material being done at a temperature within the range between about 5° C., and about 50° C., the amount of said activating gas being sufficient to provide between 0.01 and 0.4 atom of oxygen per atom of sodium on the catalyst.

10. The process in accordance with claim 9 wherein the amount of said activating gas is sufficient to provide between 0.1 and 0.4 atom of oxygen per atom of sodium on the catalyst.

References Cited
UNITED STATES PATENTS 2,994,727    8/1961    Appell et al. _____ 260—683.2

DELBERT E. GANTZ, *Primary Examiner.*

V. O'KEEFE, *Assistant Examiner.*